(12) United States Patent
Kiss et al.

(10) Patent No.: US 8,203,948 B2
(45) Date of Patent: Jun. 19, 2012

(54) SESSION ADMISSION CONTROL IN A COMMUNICATIONS NETWORK

(75) Inventors: Norbert Kiss, Budapest (HU); Gergely Pongracz, Budapest (HU); Gergely Seres, Pecs (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 122 days.

(21) Appl. No.: 12/602,620

(22) PCT Filed: Jun. 1, 2007

(86) PCT No.: PCT/EP2007/055388
§ 371 (c)(1),
(2), (4) Date: Mar. 25, 2010

(87) PCT Pub. No.: WO2008/145195
PCT Pub. Date: Dec. 4, 2008

(65) Prior Publication Data
US 2010/0177634 A1    Jul. 15, 2010

(51) Int. Cl.
*H04L 12/26* (2006.01)
*H04L 12/66* (2006.01)

(52) U.S. Cl. ........... 370/230; 370/352

(58) Field of Classification Search .......... None
See application file for complete search history.

(56) References Cited

U.S. PATENT DOCUMENTS
2005/0052996 A1* 3/2005 Houck et al. ............. 370/230

FOREIGN PATENT DOCUMENTS
WO    WO 2004/092927 A    10/2004

OTHER PUBLICATIONS

Blake, et al. An Architecture for Differentiated Services. Network Working Group. RFC 2475. Jun. 1, 2007.
Braden, et al. Resource ReSerVation Protocol (RSVP)—Version 1 Functional Specification. Network Working Group. RFC 2205. Sep. 1997.
Yang, CQ. et al. A Taxonomy for Congestion Control Algorithms in Packet Switch Networks. IEEE Network; IEEE Service Center. Jul. 1, 1995.

* cited by examiner

*Primary Examiner* — Clemence Han

(57) ABSTRACT

There is provided a en edge node and a method of controlling session admission in a communications network. The method comprises measuring a Quality of Service parameter between an edge node and a corresponding edge node and, on the basis of the measured Quality of Service parameter, calculating a target window size. The target window size relates to the maximum rate of data that can be sent from the edge node to the corresponding edge node while retaining a predetermined Quality of Service. A current window size is determined on the basis of existing established sessions between the two edge nodes. When a request for session admission is received, the current window size is compared with the target window size and, on the basis of the comparison, a determination is made whether to admit the request for session admission.

11 Claims, 5 Drawing Sheets

SESSION ADMISSION CONTROL IN A COMMUNICATIONS NETWORK

TECHNICAL FIELD

The invention relates to the field of session admission control in a communications network.

BACKGROUND

Techniques for carrying voice and multimedia calls over Internet-Protocol-based transport networks (whether access or core) are still being developed, and several problem areas that require addressing still exist. One such area is quality of service (QoS). Differentiated services (RFC 2475) can separate classes of traffic, but is unable to make resource reservations for the traffic. While network edge devices can control the amount of calls they admit into the network, congestions can still occur on bottleneck links in the uncontrolled part of the network. Reservation based protocols such as Resource ReSerVation Protocol (RSVP), RFC 2205, can handle this situation, but on the other hand, they introduce unacceptable complexity and overhead into the network.

Measurement based call admission control (MBAC) algorithms can extend the control of the edge devices to complete paths in the network while at the same time keeping the complexity of the call admission control low. Path-based MBAC algorithms measure the QoS characteristics (e.g. packet loss, jitter) of network paths between pairs of edge nodes by monitoring the traffic generated by ongoing user sessions (e.g. voice conversations). The protocols most commonly used for such tasks are the Real Time Protocol (RTP) and the Real Time Control Protocol (RTCP).

Information regarding the QoS experienced by ongoing calls between each edge node (media gateway) pair can be utilized by edge nodes to influence the routing or admission of newly arriving calls.

Another case where it would be desirable for edge nodes to influence routing or admission is the IP based Systems Architecture Evolution (beyond 3G) network. In this type of network, it is supposed that there will be a layer 3 (IP) network between the base stations (eNodeB) and the gateways (GSN+ or SAE-GW) carrying mostly voice and streaming traffic.

In a network, when a link utilization approaches 100% on a bottleneck link in a core network path, a delay and delay variation experienced by a voice call increases rapidly and packet loss may occur, leading to a degradation in voice quality, and so a reduced user experience.

Voice quality of a voice call can be defined using either subjective or objective methods. The subjective method, which consists of asking a group of people to evaluate each situation and averaging the results, describes the quality with MOS (Mean Opinion Score). This is a vital approach but the results are difficult to reproduce and they scatter considerably for different languages.

An objective method, such as Perceptual Evaluation of Speech Quality (PESQ), provides reproducible and comparable results for a given codec and network situation. Its operation is based on the comparison of the original and the encoded audio, taking into consideration the properties of human hearing. Both MOS and PESQ are expressed on a scale from 1 to 5. The PESQ values correspond well to the MOS values. The interpretation of the different scores is given in Table 1.

TABLE 1

Interpretation of PESQ values

| User satisfaction | MOS [PESQ] | Subjective value |
|---|---|---|
| Very satisfied | 4.3-5.0 | Desirable |
| Satisfied | 4.0-4.3 | |
| Some users dissatisfied | 3.6-4.0 | Acceptable |
| Many users dissatisfied | 3.1-3.6 | Not acceptable for toll |
| Nearly all users dissatisfied | 2.6-3.1 | quality |
| Not recommended | 1.0-2.6 | |

Codecs are affected in different ways by network problems, such as packet loss, delay and delay variance (jitter). The most frequently used audio codecs, which are in use in VoIP systems, are shown in Table 2. These codecs are all standardized by ITU.

TABLE 2

Frequently used voice codecs

| Codec | Encoding technique |
|---|---|
| G.711 | Pulse Code Modulation (PCM) with A- or μ-law characteristic |
| G.723.1 (5.3) | Algebraic-Code-Excited Linear Prediction |
| G.723.1 (6.3) | (ACELP) Multi-pulse Maximum Likelihood Quantization (MP-MLQ) |
| G.726 | Adaptive Differential Pulse Code Modulation (ADPCM) |
| G.728 | Low-Delay Code Excited Linear Prediction (LD-CELP) |
| G.729 | Conjugate-Structure Algebraic-Code-Excited Linear Prediction (CS-ACELP) |

Some important characteristics of the above codecs are summarized in Table 3.

TABLE 3

Codec Characteristics

| Codec | Net bandwidth [kbps] | Payload sampling time [ms] | Delay [ms] | Quality [PESQ] | Quality at 1% packet loss [PESQ] | Silence Compression (SC) supported |
|---|---|---|---|---|---|---|
| G.711 | 64 | 10/20/30/40 | <1 | 4.45 | 4.13 | No |
| G.723.1 | 5.3 | 30 | 38 | 3.63 | 3.58 | Yes |
| | 6.3 | | | 3.76 | 3.70 | |
| G.726 | 16 | 5 | 5 | 3.23 | 3.20 | No |
| | 24 | | | 3.74 | 3.68 | |
| | 32 | | | 4.09 | 3.98 | |
| | 40 | | | 4.31 | 4.14 | |
| G.728 | 16 | 5 | 10 | 4.04 | 3.95 | No |
| G.729 | 8 | 10/20/30/40 | 15 | 3.81 | 3.73 | Yes |

Fractional packet loss (PL) is one of the key parameters that determines the audio quality. It is defined as:

$$PL = \frac{\text{sent packets} - \text{received packets}}{\text{sent packets}} \quad (1)$$

Different codecs are sensitive to PL to different extents, but it is not the bit rate and compression ratio that are determinant in this aspect. For example, the original G.711 has a weaker quality at over 4-5% PL than most modern low bit rate codecs. The reason for this is the application of packet loss concealment (PLC) algorithms that were not available for the original G.711 specification. As for G.729, the voice quality remains 'acceptable' (MOS is superior to 3.6) at over 1% PL if it is distributed randomly. Speech will remain comprehensible at up to 10% PL.

It is apparent that the advanced codecs can tolerate a slight packet loss easily, maintaining a good PESQ value. An example can be seen on FIG. 1, which shows a graph of audio quality of the G.729 codec as a function of packet loss.

Delay is also an essential parameter in user satisfaction. Factors affecting delay include the codec delay, the queuing delay in the network and the propagation of packets. Usually a delay of 100-150 ms is permissible in one direction, but the round-trip delay (RTD) must not exceed 250 ms.

This amount of delay can be easily avoided by using delay sensitive buffering and queuing on the routers along the voice path (e.g. DiffServ EF class). In this way, the delay won't be large, but fluctuation in the traffic can lead to packet loss earlier.

The main factors that must be addressed when developing a QoS algorithm are the stability (whether the system reaches a stable state, where an acceptable quality is coupled with good utilization) and the response time (whether it reaches this stable state fast enough after the call frequency changes).

The requirements for a successful QoS control algorithm are as follows:

1) It must offer good utilization in the long run even in a congested situation;
2) It must prevent unacceptable voice quality due to large over-utilization thus large packet loss on the bottleneck link(s);
3) It must not require large effort from the core network nodes (e.g. reservation, signalling, flow based packet scheduling), because of the huge number of active flows on such nodes; and
4) It should be able to deal with any kind of external traffic scenarios (e.g. focused overload, quickly fluctuating traffic, step overload).

Several solutions for session QoS control methods have been developed, which all have their own advantages and problems. Some of these are described below:

a. Reservation-Based Scheme, Involving the Core Network Nodes.

Reservation based protocols (that require the participation of core network nodes) like RSVP are conservative, and intelligent ones that can meet requirements 1, 2 and 4 above.

On the other hand, such protocols fail to meet requirement 3, as they require far more complexity in the network nodes not only in the edge, but also in the core network. In the case of big core networks, the overhead caused by the signalling and the internal data processing requirements of such algorithms is unacceptable. There are several studies for solving, or at least minimizing this problem, but so far no suitable solution was found.

b. DiffServ in Multi-Service Networks and/or Over-Provisioning

Another approach is using DiffServ in the core network, which is a good solution in the case of multi-service networks carrying mostly best effort data (data sent with no guarantee of delivery). In this case, the bandwidth provided by the core network is much bigger than the needs of the voice traffic. As voice has priority over the best effort traffic, the full link bandwidth can be used to handle bursts in the voice traffic, so in this case packet loss can be avoided.

When it comes to networks used mainly by voice and other delay sensitive traffic (streaming for example) the situation is not so favourable. In this case the average utilization of bottleneck links should be low in order to control traffic peaks. This is known as over-provisioning, and meets requirements 2, 3 and in most cases 4. However, this solution leads to complex topology planning problems, and often to underutilized links due to over-provisioning adjusting the capacity of a link to a peak traffic load. To avoid that, while at the same time maintaining a "good enough" QoS level, the usage of dynamic, measurement-based CAC algorithms can be considered.

c. DiffServ and MBAC (or Dedicated QoS Network and MBAC)

There are several MBAC strategies for QoS control that can be characterised by the following factors:

1. The measured parameters: packet loss, jitter, IP header flag, for example Explicit Congestion notification (ECN)
2. The control method used may be one of:
   a. a percentage based restriction for the arriving calls/sessions;
   b. rate controlling the incoming call/session setup rate (leaky bucket); or
   c. aggregate control (window)

A block all/admit all strategy may be used for QoS control. This type of measurement based CAC strategy uses measurements of packet loss in the network, and a simple predetermined threshold level to determine admission. Above this threshold (e.g. packet loss>1%), all incoming calls are rejected, whereas below this threshold, all incoming calls are accepted. This approach leads to a fast response time, but the system has no chance of finding a stable state, as the utilization of the controlled link oscillates heavily. A drawback of this reactive on/off type admission control approach (block all/admit all) is that it requires very frequent measurements in the network.

The block all/admit all strategy meets requirement 3, and partly meets requirement 1, 2 and 4 depending on the threshold level, and the frequency of the QoS performance measurements. Frequently taken measurements can be suitable for all of the requirements. However, increasing the frequency of the measurements can easily overload the edge nodes, and the response time of the system cannot be reduced below a theoretical limit.

An alternative strategy for QoS control is a quality category-based restriction factor adjustment. This involves measuring QoS performance indicators (such as jitter, packet loss), categorizing them into a discrete set of quality categories, and applying a restriction factor based CAC. Whenever a new call arrives, a check is made against the restriction factor r, which means that the probability of a new call being admitted to the network is 1−r. According to the quality categories, the algorithm can increase or decrease the restriction factor dynamically. In this case, the new r value is valid for the next measurement period.

This approach meets requirement 3, and can guarantee stability in the long run (requirement 1) or fast response time (requirement 2), depending on the configuration of the restriction change parameters.

Reaction speed and stability can be improved by introducing memory in the system effectively by using a matrix of restriction change parameters.

A disadvantage of a restriction factor based method is that it is vulnerable to changes in the external call arrival intensity. If the call intensity suddenly doubles, the admitted rate doubles as well for some measurement periods.

A further strategy is to use a token bucket instead of a restriction factor, which is capable of decreasing the call initiation capacity of the gateway, thus reducing call arrival intensity. Because the call holding time is unchanged, this reduces the number of ongoing calls to a given value as well.

Leaky bucket rate control can be used to avoid the drawbacks of the percentage based rate control, but introduces further complexity to the edge nodes.

SUMMARY

This invention determines session admission control using an adaptively set window. The number of ongoing calls that can be active on a given network path can be limited by an adaptively adjusted number, termed window size. When a new call arrives, the current fill of the window (calls already admitted and ongoing) is compared to the limit (the maximum size of the window), and the call can only be admitted if the limit has not yet been reached. Once the call is admitted, the current fill is increased to take into account the admitted call.

A 'window' is defined between a pair of edge-nodes, and determines the resources that can be used between the two edge-nodes in a given direction. It can be measured in <kbps> or simply <number of active calls>. When a new session is initiated, a check is made to determine whether there are sufficient free resources in the window to guarantee that large packet loss will not occur if the call is admitted. The new session will only be accepted if the required resources are available in the given window.

In one embodiment, the amount of available resources is determined from measuring packet loss in the network, where manual pre-configuration of these values would not be possible.

By increasing the window size of the given path only by a given factor in every period, the packet loss that can be caused by the traffic increase can be limited to a tolerable level. The period is the interval between adjustments of the admission factor, and hence is the same as the interval between measurements of the packet loss.

The session admission control method fulfils the four requirements of the measurement based CAC algorithms:
1. It offers good (nearly peak) utilization. Utilization may even exceed 100% as a minimal packet loss can be tolerated;
2. It can prevent voice quality degradation due to exhausted resources;
3. It does not require any additional algorithms inside the core nodes; and
4. It is not affected at all by the changes in the external call/session setup intensity.

According to a first aspect of the invention, there is provided a method of controlling session admission in a communications network. The method comprises measuring a Quality of Service parameter between an edge node and a corresponding edge node in order to determine the Quality of Service experience by a user. On the basis of the measured Quality of Service parameter a target window size is calculated, the target window size relating to the maximum rate of data that can be sent from the edge node to the corresponding edge node whilst retaining a predetermined Quality of Service. The current window size is determined on the basis of existing established sessions between the two edge nodes. When a request for session admission is received, the current window size is compared with the target window size, and it is determined whether or not to admit the request for session admission on the basis of the comparison.

It is preferred that the Quality of Service parameter is selected from packet loss, jitter and Explicit Congestion Notification. Packet loss can be measured in any network, but other Quality of Service parameters may be provided depending on the protocol used to transmit data.

In order to dynamically adjust the target window size to take into account variations in the network conditions, it is preferred that the Quality of Service parameter is measured periodically, and the target window size is redefined after each measurement.

Once a session has been accepted, the current window size may be increased by an amount relating to the resources used by the session, in order to keep the current window size up-to-date. Similarly, once a session has been released, the current window size may be decreased by an amount relating to the resources used by the session.

Where packet loss is used to measure QoS, the method may comprise measuring packet loss between the edge nodes and comparing the packet loss to a maximum permitted packet loss. In this instance, the target window size may be adapted on the basis of a relationship between the current target window size and the measured or the maximum permitted fractional packet loss.

After taking a packet loss measurement, the target window size may be increased if the measured packet loss is less than the maximum permitted packet loss, in normal operation, and may be decreased if the measured packet loss is greater than the maximum permitted packet loss in normal operation. The maximum target window size may be calculated on the basis of the fractional packet loss. If the target window size is greater than the calculated maximum target window size, then it may be decreased to the calculated maximum target window size.

According to a second aspect of the invention, there is provided an edge node for use in a communications network. The edge node comprises a receiver for receiving a request for session admission and a memory for storing values relating to a target window size and a current window size. The target window size relates to the maximum rate of data that can be sent from the edge node to the corresponding edge node whilst retaining a predetermined Quality of Service. The edge node further comprises a processor for comparing the current window size with the target window size, and means for determining whether to admit the request on the basis of the comparison.

The edge node may further comprise means for measuring a Quality of Service parameter between the edge node and a corresponding edge node, and in addition may further comprise a processor for calculating the target window size on the basis of the measured Quality of Service parameter.

DETAILED DESCRIPTION

Figure 1:
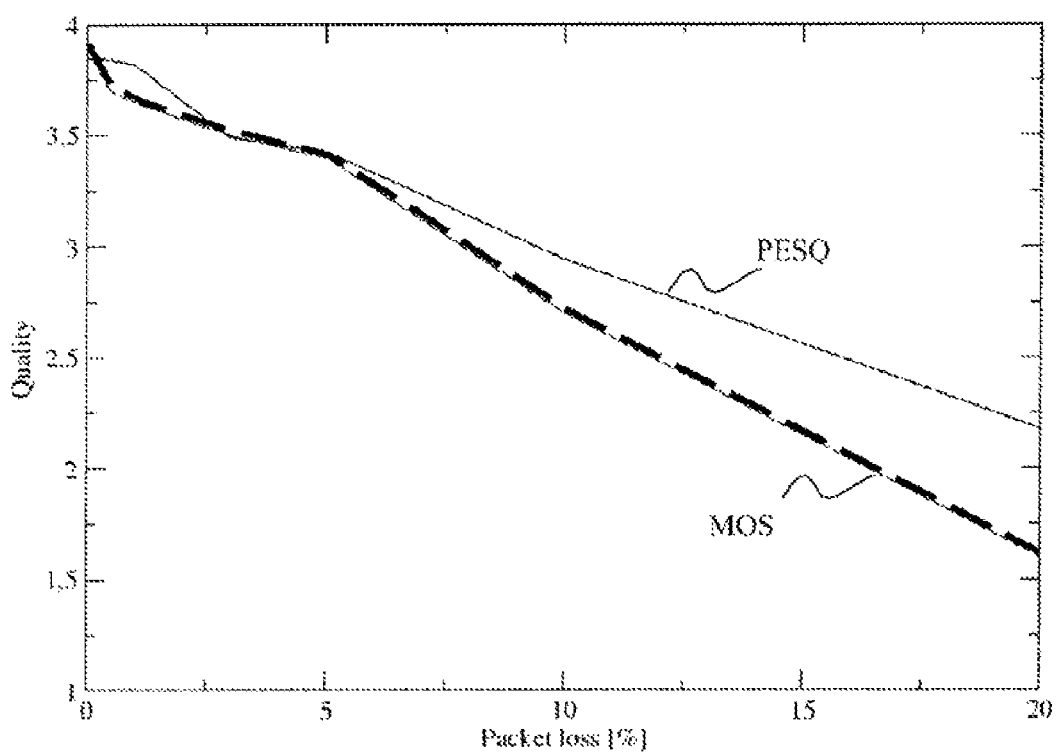
FIG. 1 is a prior art graph of audio quality of the G.729 codec as a function of packet loss.

The following internal values are kept on record at each edge node, distinctly for every two edge-nodes and for the two directions between the edge nodes:

$wt_{i,j}(t)$: target window size, the permitted maximum window size from the edge-node i to the edge-node j at time t (the available resources)

$w_{i,j}(t)$: current window size, the fullness of the window between the edge-nodes i and j at time t (the allocated resources)

When a new session is initiated between the edge-nodes i and j, the actual fullness w of the corresponding window is checked. If there are sufficient free resources for the new session, then the new session can be admitted, and its required resources are added to the fullness of the window.

When a session is cleared down, its resources must be freed. This means that the actual window size w will be decreased by the resources used by the given session.

In most cases it is enough to add 1 to the window size in case of a new session initiation (and remove 1 during release), so effectively the window size will show the number of active sessions on the given path. However, there might be some cases when different sessions have very different bandwidth requirements, and the mix of the sessions changes rapidly. In such case the resources can be specified by bit rate (br), which can increase the precision of the method. In this case, the procedure is as follows:

1. At call setup check the following equation:

$$w_{i,j}(t)+br \leq wt_{i,j}(t) \quad (2)$$

a. If Equation 2 is true, add br to the current utilization as follows:

$$w_{i,j}(t)=w_{i,j}(t)+br \quad (3)$$

b. If Equation 2 is false, reject the call

2. At call cleardown, modify the window size by removing br from it according to Equation 4:

$$w_{i,j}(t)=w_{i,j}(t)-br \quad (4)$$

The current utilization w can exceed the actually valid target utilization wt. This is typical when the overload is noticed. In this case, the target utilization is set to a smaller value than the actual, which basically means, that no new calls/sessions are admitted until there are enough call releases to reduce the actual utilization below the target.

The nodes check the parameters to measure QoS (typically packet loss, although other measurements can be used) on each path periodically, and update the target utilization on the given path. The time between measurement period is be defined by the network operators.

Figure 2:
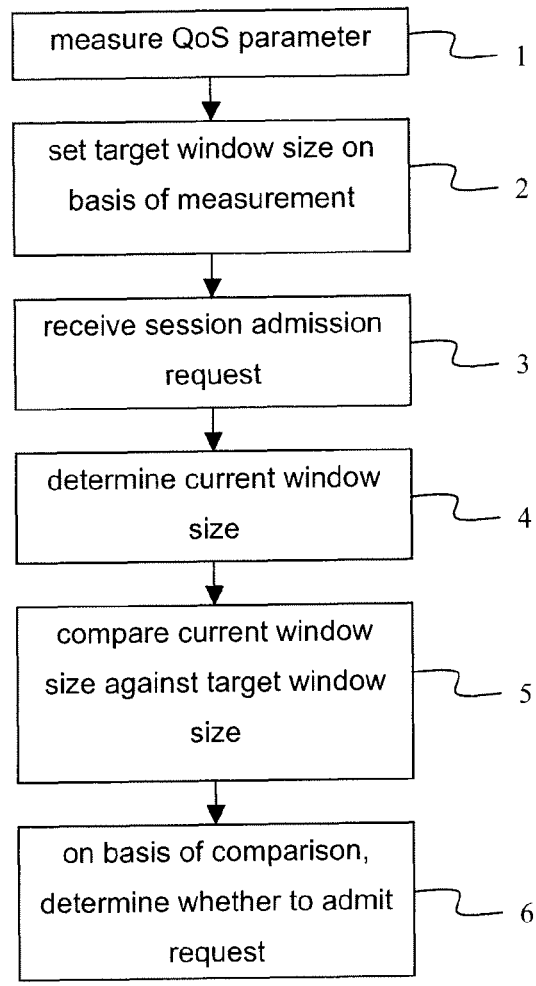
FIG. 2 is a flow diagram illustrating the basic steps of the invention.

Referring to FIG. 2, there is shown a flow diagram illustrating the basic steps of the invention. A QoS parameter is measured 1 and the target window size is set on the basis of the measurement 2. When a session admission request is received 3, the current window size is determined 4 and compared 5 with the target window size, and a decision on whether to admit the session is made 6 on the basis of the comparison.

Figure 3:
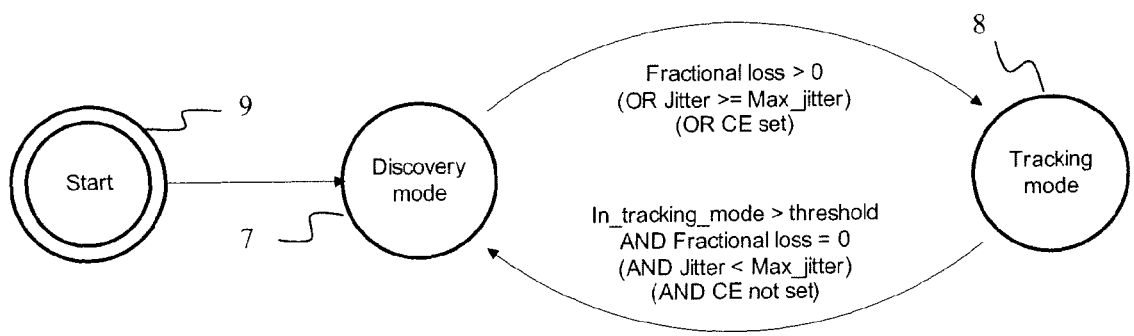
FIG. 3 illustrates schematically a state diagram showing when the system switches between modes.

In order to dynamically adjust the target window size, two modes of operation are defined, as illustrated in FIG. 3, in which CE means Congestion Experienced.

1. 'Discovery' mode 7, in which the admitted traffic is not limited at all, or limited, but the target window size is increased in large steps to allow fast convergence, yet does not allow huge bursts to enter and cause huge packet loss (and thus quality degradation); and 2. 'Tracking' mode 8, which is the operation to correctly handle overload or predicted overload situations.

'Discovery' Mode

This operation mode is used where it can be assumed that no overload is present, and no overload is foreseen. Discovery mode 7 is typically used after start-up 9 (when no measurement data are available), or when the measured packet loss is 0 (or smaller than a threshold specific for normal operation) and other parameters (e.g. ECN, jitter) do not indicate overload.

The operator may choose from two modes, depending on the required reliability:

a. No Limitation (Fast Convergence is the Priority)

If fast convergence is a high priority (so there are no rejected calls as long as there is no need to do so), and an initial larger packet loss can be tolerated, as long as nothing indicates overload, the admitted traffic is not be restricted at all (that is, the window size is to be set to infinite):

$$wt_{i,j}(0)=\infty \quad (5)$$

b. High-Reliability Mode (Limited Packet Loss is the Priority)

For guaranteed high-reliability, the "no limitation" mode might be insufficient, as there is a chance that a sudden burst would cause over-utilization between measurements. Using the high reliability mode, the operator defines a maximum permitted fractional packet loss, which determines the ratio of the increase of the window size in 'discovery' mode (denoted by $permpl_{disc}$). For voice communication, it is suggested that this factor equals to the packet loss where the speech quality is low, but comprehensible on the worst codec used on that path (~10%). The steps are as follows:

1. The initial target is infinity:

$$wt_{i,j}(0)=\infty \quad (6)$$

2. After each measurement on the network, the target is modified on the basis of the current utilization:

$$wt_{i,j}(t+1) = \frac{w_{i,j}(t)}{1 - permpl_{disc}} \quad (7)$$

The target is set so as to allow only an increase which can not cause a packet loss larger than that permitted by the QoS requirements.

The high-reliability mode allows a quick adaptation of the window size, but also ensures a worst-case guarantee against sudden overload. There is a trade-off between the adaptation speed and the strictness of this guarantee.

In most cases however this guarantee is not necessary, so the target can be set to infinity.

'Tracking' Mode

Tracking mode 8 is used when overload is foreseeable or it has already occurred. There are three sub-cases:

1. Overload

In this case the measured packet loss (pl) is above the threshold specified for normal operation. This is usually a low number (e.g. 0.01-0.1%), but it can be set higher, depending on the tolerance of the used codec (for example, if a codec is being used that is particularly sensitive to loss).

If the actual resources ($res_{i,j}(t)$) used during the last measurement period (which can be approximated by $w_{i,j}(t)$ and fractional packet loss ($pl_{i,j}(t)$) are known, then the exact available resources (capacity) on the given path can be computed. This can be deduced as follows:

$$\frac{res_{i,j}(t) - capacity_{i,j}}{res_{i,j}(t)} = pl_{i,j}(t) \quad (8)$$

$$capacity_{i,j} = res_{i,j}(t) \times (1 - pl_{i,j}(t)) \quad (9)$$

The window size should be decreased according to the following equation:

$$wt_{i,j}(t+1) = w_{i,j}(t) \times (1 - pl_{i,j}(t)) \quad (10)$$

2. Non-Overload

In this case, the measured packet loss is lower than the threshold specified for normal operation. In practice this is the case when pl is very close to 0.

The window size can be 'cautiously' increased, taking into consideration the possible overload. The operator may define a maximal permitted fractional packet loss for the 'tracking' mode.

For voice communication, it is suggested that this factor is equal to the packet loss where the speech quality remains acceptable on the worst codec used on that path (~2-3%). In this way, speech quality will not be degraded before the next measurement cycle. The method for ensuring this, according to the above deduction, is to set the window size as follows:

$$wt_{i,j}(t+1) = \frac{w_{i,j}(t)}{1 - permpl_{tracking}} \quad (11)$$

3. Foreseen Overload

In this case, the measured packet loss does not indicate any problem, but other values (such as jitter or ECN) indicate that the network path is utilized at almost 100%. The window size can remain unchanged, or cautiously increased. This is not described in detail, as it introduces complexities into the network because other parameters have to be measured together with packet loss.

Transition Between the Operation Modes

1. 'Discovery'—'Discovery'

When there is no evidence or prediction of overload, the system operates in 'discovery' mode 7. The conditions for this are as follows:

At start-up 9 the node begins at 'discovery' mode 7
Until the packet loss is below the value specified for normal operation and none of other measured parameters (e.g. ECN, jitter) indicate overload it remains at 'discovery' mode 7

2. 'Discovery'—'Tracking'

When the network is overloaded or some parameter indicates a foreseeable overload, the system switches to 'tracking' mode 8. Indicators of foreseeable overload are described below.

3. 'Tracking'—'Tracking'

Once the system is in 'tracking' mode 8, it should remain in 'tracking' mode 8 as long as at least one of the following conditions is true:

Packet loss is over a value specified for normal operation;
Any of the measured parameters other than packet loss have reached the maximum permitted value (near overload); or
There are no parameters indicating that the link is overloaded, but in the near past there was an overload. In this case the system must remain in 'tracking' mode, cautiously increasing the admitted traffic.

4. 'Tracking'—'Discovery'

When the network is not overloaded, and this result was measured during more than one consecutive measurement cycle, the operation switches back to 'discovery' mode 7. The number of consecutive measurement cycles needed before the switch is a parameter that can be set by the operator (indicated as threshold below).

Configuration parameters and suggested values are shown below in Table 4.

TABLE 4

Configuration parameters and suggested values

| Parameter name | Short description | Suggested value |
|---|---|---|
| plthr$_{normal}$ | Packet loss threshold in normal operation, the system decides its overload status using this value | 0.1% |
| permpl$_{disc}$ | Permitted packet loss in discovery mode | 10% or 100%[a] |
| permpl$_{tracking}$ | Permitted packet loss in tracking mode | 1-2% |
| threshold | The threshold contains the number of consecutive measurement cycles where the system does not sense overload in 'tracking' mode before it switches back to 'discovery' mode | 10 |
| T$_{meas}$ | The length of the measurement cycle | 5 sec |

[a]100% relates to the system in discovery mode where the window size is set to infinity and the system does not control the session.

If other measurements (jitter, ECN) are available, then more parameters (e.g. max_jitter) may be defined to control their behaviour.

By observing (in live networks) or artificially creating (in lab environment) packet loss one can easily calculate how the number of admitted sessions should change.

The invention has a low performance impact, and is very easy to implement. Only a few integers have to be stored for each pair of edge-nodes. The admission decision only requires the comparison of two integer numbers.

The invention is also easy to configure. There are only two parameters to be obligatorily set: the maximal permitted fractional PL in 'tracking' and in 'discovery' modes. These can be set in a well justifiable manner knowing the PL tolerance of the used codecs.

The invention does not require a random number generator (as in the percentage based CAC), the quality of which could affect the performance of the admission control.

The method of the invention controls even the highest imaginable overload. Even if high fractional PL occurs before the transition from 'discovery' to 'tracking' mode (it can happen if an infinite window size is used in 'discovery' mode), it will decrease to practically 0 after a few measurement periods. The effectiveness of other techniques usually falls as the overload becomes higher.

Whilst the above description refers mostly to measuring packet loss as a way of determining QoS, the invention can also use other measurable parameters (e.g. ECN, jitter) if they are available. The measurement of parameters other than PL helps to foresee the overload situation and to prevent a significant instantaneous fractional PL by switching from 'discovery' to 'tracking' mode before PL could occur at all.

The invention aims to ascertain the available free bit rate as soon as theoretically possible (at least from the available measurement data), and guarantees not to exceed it further on.

EXAMPLE

Comparison of different measurement based session control algorithms shows that the invented method outperforms percentage based restriction methods. All four requirements (high utilization, good quality, no internal protocol need, robustness) were met.

Packet loss using different CACs was simulated using a simple bottleneck architecture.

The call arrival rate was calculated using exponential distribution. The holding times were also calculated with the use of exponential distribution. The traffic generated by one session is Constant Bit-rate (CBR), but the sessions used an ON-OFF pattern, so on average 40% of the sessions were active (ON), while the others were in passive state.

The sum of the sessions had a bandwidth need which is 3 times the bottleneck link capacity, so the sum of the traffic generated by the active (ON) sessions would be 2 times the link capacity if call admission had not been used.

The above described window based CAC algorithm was used with the parameters set out in Table 5:

TABLE 5

Parameters used in simulation

| Parameter name | Short description | Suggested value |
| --- | --- | --- |
| plthr$_{normal}$ | Packet loss threshold in normal operation, the system decides its overload status using this value | 0.01% |
| permpl$_{disc}$ | Permitted packet loss in discovery mode | 100% |
| permpl$_{tracking}$ | Permitted packet loss in tracking mode | 3% |
| threshold | The threshold contains the number of consecutive measurement cycles where the system does not sense overload in 'tracking' mode before it switches back to 'discovery' mode | 10 |
| T$_{meas}$ | The length of the measurement cycle | 3 sec |

Figure 4:
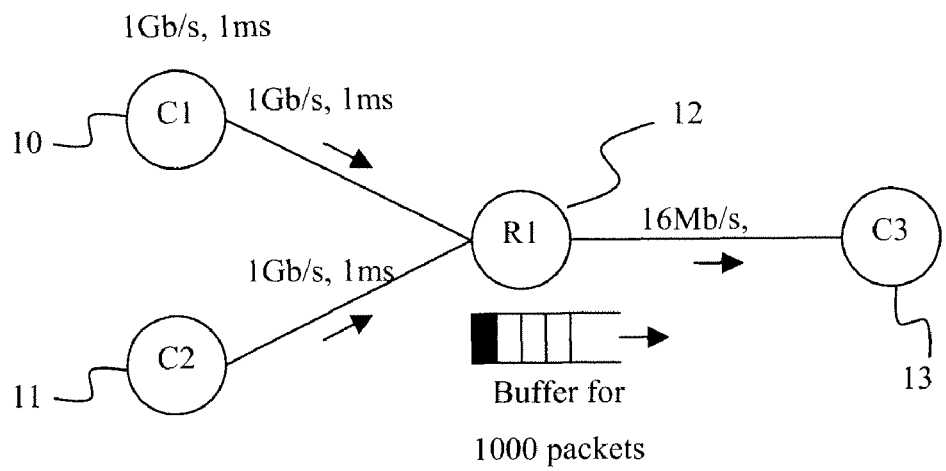
FIG. 4 illustrates schematically a simulated test network.

The simulated test network is illustrated in FIG. 4, illustrating 2 concentrators 10, 11, which send data to a router 12. The router 12 in turn sends data to a third concentrator 13. One flow in ON state is 16 kbps with the IP/UDP/RTP overhead. The maximum number of calls in ON is 1000 in the test network.

Figure 5:
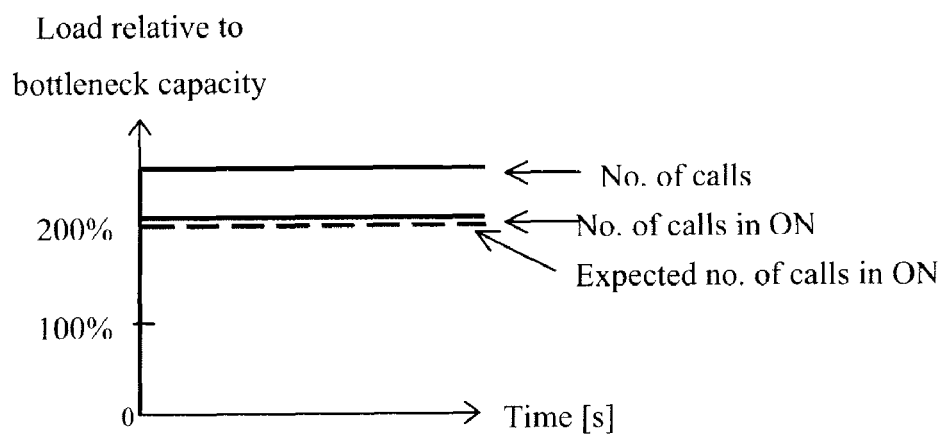
FIG. 5 illustrates schematically the tested load scheme of load relative to bottleneck capacity against time.

The tested load scheme is illustrated in FIG. 5 (the green line shows the average number of calls in ON). This load profile means, that the intensity is set to reach the 200% load in the long run. The ramp up to 200% takes ~100 seconds.

Figure 6:
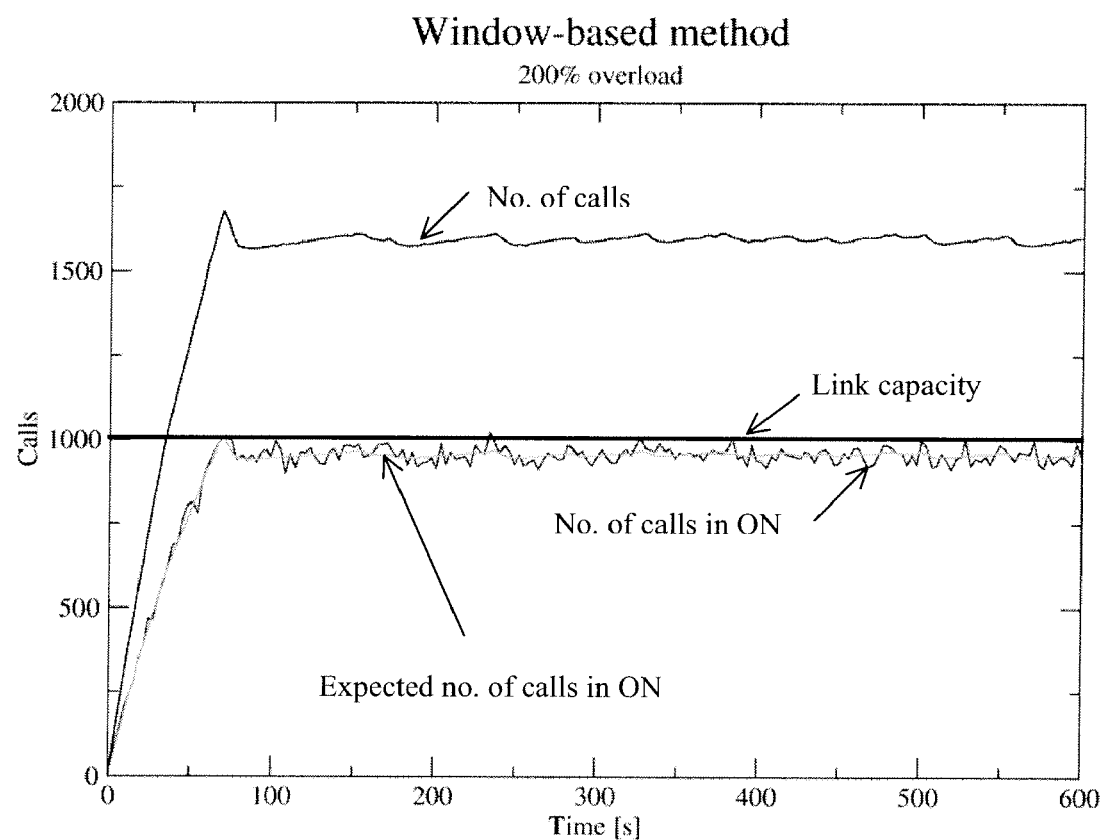
FIG. 6 is a graph showing call admissions over time during the simulated test.
Figure 7:
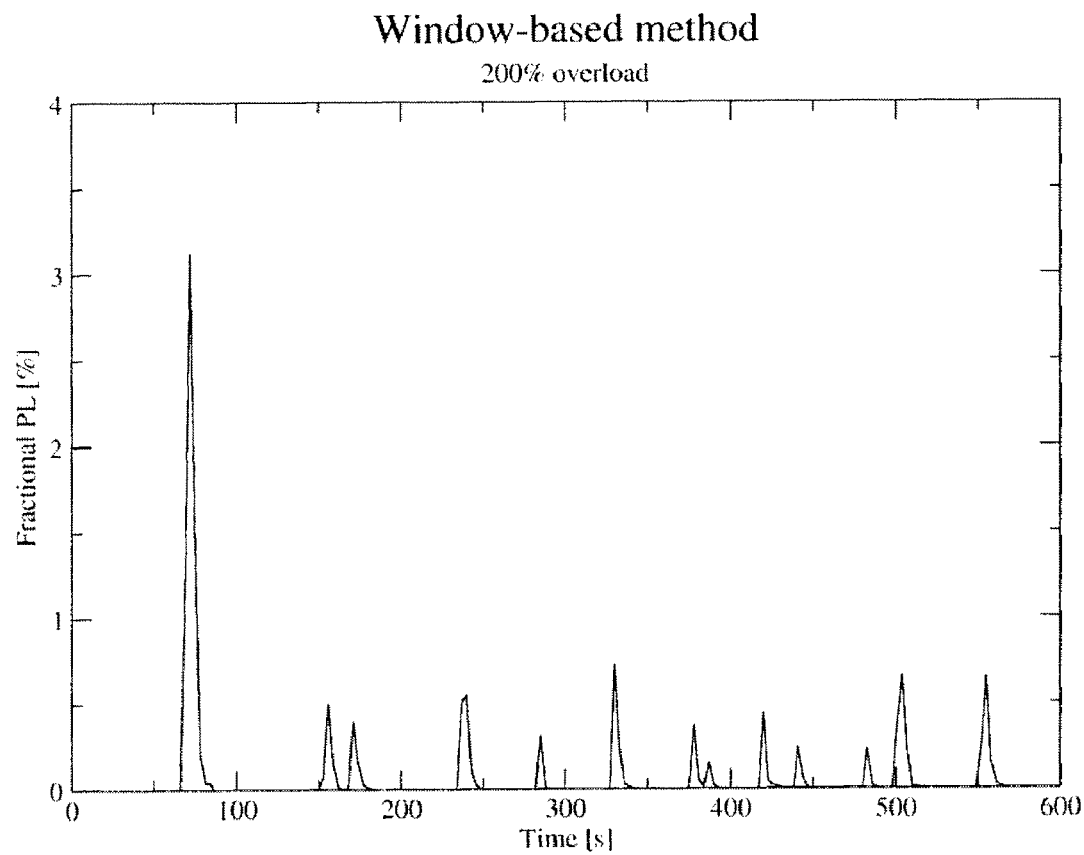
FIG. 7 is a graph showing the packet loss experienced during the simulated test.

FIG. 6 shows the number of admitted calls using the method of the invention, and FIG. 7 shows the simulated packet loss experienced during the test. It can be seen that even with a very simple setup (only packet loss measurement, simple 'discovery' mode), the algorithm was able to guarantee that only a minimal packet loss occurred, which is not noticeable for the users, as there is no serious quality degradation at such low packet loss values.

The maximum permitted PL was 1%. The resulting average PL was 0.43% while 53.64% of initiated calls had been accepted. The restriction-based method would have resulted 1.53% and 52.94% respectively. The 1% PL threshold was not respected and both values are more unfavourable.

Figure 8:
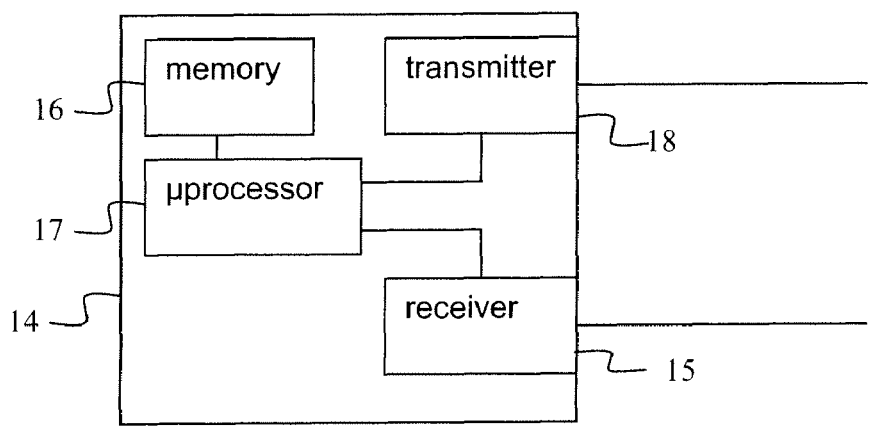
FIG. 8 illustrates schematically a network edge node according to an embodiment of the invention.

Referring to FIG. 8, an example of an edge node 14 for use in a network is shown. The edge node 14 has a receiver 15 for receiving a session admission request, and a memory 16 storing a target window size between the edge node 14 and another edge node in the network. The memory 16 also stores the current window size between the edge node 14 and the other edge node in the network. A processor 17 is provided to compare the target window size with the current window size and determine whether the session should be admitted or not. A transmitter 18 is also provided to allow the edge node 14 to communicate with the other edge node in the network. In one embodiment, the processor 17 may also be used to dynamically adapt the target window size as a result of QoS measurements between the edge node 14 and the other edge node.

It will be appreciated by the person of skill in the art that various modifications may be made to the above described embodiments without departing from the scope of the present invention.

The invention claimed is:

1. A method of controlling session admission in a communications network, the method comprising:
    measuring a Quality of Service parameter between an edge node and a corresponding edge node;
    on the basis of the measured Quality of Service parameter, calculating a target window size, the target window size relating to the maximum rate of data that can be sent from the edge node to the corresponding edge node whilst retaining a predetermined Quality of Service;
    determining a current window size on the basis of existing established sessions between the two edge nodes;
    receiving a request for session admission;
    comparing the current window size with the target window size; and
    on the basis of the comparison, determining whether to admit the request for session admission.

2. The method according to claim 1, wherein the Quality of Service parameter is selected from packet loss, jitter and Explicit Congestion Notification.

3. The method according to claim 1, comprising:
    measuring the Quality of Service parameter periodically; and
    redefining the target window size after each measurement.

4. The method according to claim 1, comprising, after a session has been accepted, increasing the current window size by an amount relating to the resources used by the session.

5. The method according to claim 1, comprising, after a session has been released, decreasing the current window size by an amount relating to the resources used by the session.

6. The method according to claim 1, further comprising measuring packet loss between the edge nodes and comparing the packet loss to a maximum permitted packet loss.

7. The method according claim 6, the method comprising:
    after measuring the packet loss, adapting the target window size on the basis of a relationship between the current target window size and the measured or maximum permitted fractional packet loss.

8. The method according to claim 6, the method comprising, after measuring packet loss, increasing the target window size if the measured packet loss is less than the maximum permitted packet loss in normal operation, and decreasing the target window size if the measured packet loss is greater than the maximum permitted packet loss in normal operation.

9. An edge node for use in a communications network, the edge node comprising:
    a receiver for receiving a request for session admission;
    a memory for storing values relating to a target window size and a current window size, the target window size relating to a maximum rate of data that can be sent from the edge node to a corresponding edge node whilst retaining a predetermined Quality of Service;
    a processor for comparing the current window size with the target window size; and
    means for determining whether to admit the request on the basis of the comparison.

10. The edge node according to claim 9, further comprising means for measuring a Quality of Service parameter between the edge node and the corresponding edge node.

11. The edge node according to claim 10, further comprising a processor for calculating the target window size on the basis of the measured Quality of Service parameter.

* * * * *

UNITED STATES PATENT AND TRADEMARK OFFICE
CERTIFICATE OF CORRECTION

| | | |
|---|---|---|
| PATENT NO. | : 8,203,948 B2 | Page 1 of 1 |
| APPLICATION NO. | : 12/602620 | |
| DATED | : June 19, 2012 | |
| INVENTOR(S) | : Kiss et al. | |

It is certified that error appears in the above-identified patent and that said Letters Patent is hereby corrected as shown below:

Title Page, Item (57), under "ABSTRACT", in Column 2, Line 1, delete "a en" and insert -- an --, therefor.

In Fig. 8, Sheet 5 of 5, for Tag "17", in Line 1, delete "µprocessor" and insert -- processor --, therefor.

In Column 12, Line 37, in Claim 7, delete "according" and insert -- according to --, therefor.

Signed and Sealed this
Eleventh Day of September, 2012

David J. Kappos
*Director of the United States Patent and Trademark Office*